United States Patent
Breynaert et al.

(10) Patent No.: US 12,074,544 B2
(45) Date of Patent: Aug. 27, 2024

(54) RIPPLE CIRCUIT INCLUDING HALL EFFECT SENSOR

(71) Applicant: INTEVA PRODUCTS, LLC, Troy, MI (US)

(72) Inventors: François Breynaert, Caen (FR); Guillaume Landicheff, Caen (FR)

(73) Assignee: INTEVA PRODUCTS, LLC, Troy, MI (US)

( * ) Notice: Subject to any disclaimer, the term of this patent is extended or adjusted under 35 U.S.C. 154(b) by 160 days.

(21) Appl. No.: 17/847,925

(22) Filed: Jun. 23, 2022

(65) Prior Publication Data

US 2022/0416705 A1 Dec. 29, 2022

(30) Foreign Application Priority Data

Jun. 23, 2021 (FR) .................................... 21/06680

(51) Int. Cl.
| | |
|---|---|
| *H02P 6/08* | (2016.01) |
| *G01B 7/30* | (2006.01) |
| *G01D 5/14* | (2006.01) |
| *G01P 3/487* | (2006.01) |
| *H02P 7/06* | (2006.01) |
| *H02P 23/14* | (2006.01) |

(52) U.S. Cl.
CPC ............... *H02P 23/14* (2013.01); *G01B 7/30* (2013.01); *G01D 5/145* (2013.01); *G01P 3/487* (2013.01)

(58) Field of Classification Search
CPC . G01D 5/145; H02P 23/14; H02P 6/08; H02P 7/06; G01P 3/487; G01B 7/30
USPC ....................................................... 318/445
See application file for complete search history.

(56) References Cited

U.S. PATENT DOCUMENTS

| 4,924,166 A | * | 5/1990 | Roussel | ................ H02P 7/2855 388/813 |
|---|---|---|---|---|
| 2008/0219648 A1 | | 9/2008 | Liu | |
| 2009/0267549 A1 | * | 10/2009 | Kitagawa | ................ H02P 23/14 318/400.14 |

(Continued)

FOREIGN PATENT DOCUMENTS

WO 2011109435 A2 9/2011

OTHER PUBLICATIONS

Search Report and Written Opinion Issued in French Application No. 21/06680; Application Filing Date Jun. 23, 2021; Date of Mailing Feb. 18, 2022 (12 pages).

*Primary Examiner* — Gabriel Agared
(74) *Attorney, Agent, or Firm* — CANTOR COLBURN LLP

(57) ABSTRACT

A ripple circuit includes a sensor, and oscillator circuit and a logic gate. The sensor monitors operation of a motor that is powered by a power signal provided by a motor circuit. The sensor outputs a data signal having a first state or a second state based on the operation of the motor. The oscillator circuit generates an oscillating signal having a fixed frequency. The logic gate includes at least one input in signal communication with the sensor and the oscillator circuit and at least one output in signal communication with the motor circuit. The logic gate selectively outputs the oscillating signal based on the first state or the second state of the data signal to generate a modulated signal. The logic gate is configured to deliver the modulated signal to the motor circuit.

10 Claims, 2 Drawing Sheets

(56) References Cited

U.S. PATENT DOCUMENTS

2012/0326643 A1* 12/2012 Brannen .................. H02P 6/16
                                                      318/400.11
2020/0336147 A1* 10/2020 Breynaert .............. H03K 23/58

* cited by examiner

RIPPLE CIRCUIT INCLUDING HALL EFFECT SENSOR

CROSS-REFERENCE TO RELATED APPLICATIONS

This application claims benefit to French Application No. 21/06680, filed Jun. 23, 2021, the disclosures of which are incorporated by reference herein in their entirety.

TECHNICAL FIELD

Exemplary embodiments of the present disclosure are related to direct current (DC) motors, and more particularly, to DC motors for operating electrically operated automotive components.

BACKGROUND

Automobile vehicles are increasingly equipped with electrically operated components. For example, vehicles typically include sliding roofs, window glass regulators, or rear view mirrors driven by electric DC motors. Information indicating the rotor speed of the motor can be utilized to determine a position of the component (e.g., the window). A sensor can be utilized in conjunction with a magnetic ring to determine the rotor speed of the motor. For example, a Hall Effect Sensor (HES) can be implemented to detect movements of a magnetic ring integrated with the rotor. The magnet ring generates a magnetic flux of varying strength towards the HES depending on the relative axial position of the magnetic ring and sensor. The magnetic flux induces a current, and variations in magnetic flux result in variations in the induced currents. Accordingly, the frequency of the current measured by the HES is indicative of the rotor speed of the DC motor.

SUMMARY OF THE INVENTION

According to a non-limiting embodiment, a ripple circuit is provided. The ripple circuit includes a sensor, and oscillator circuit and a logic gate. The sensor monitors operation of a motor that is powered by a power signal provided by a motor circuit. The sensor outputs a data signal having a first state or a second state based on the operation of the motor. The oscillator circuit generates an oscillating signal having a fixed frequency. The logic gate includes at least one input in signal communication with the sensor and the oscillator circuit and at least one output in signal communication with the motor circuit. The logic gate selectively outputs the oscillating signal based on the first state or the second state of the data signal to generate a modulated signal. The logic gate is configured to deliver the modulated signal to the motor circuit.

According to a non-limiting embodiment, a method of processing a motor signal is provided. The method comprises generating, via a motor circuit 102, a power signal 121; and delivering the power signal 121 to a motor 108. The method further comprises monitoring, via a sensor 114, the power signal 121 and outputting, via the sensor 144, a data signal 105 having a first state or a second state based on the operation of the motor 108. The method further comprises generating, via an oscillator circuit 116, an oscillating signal 107 having a fixed frequency, and delivering the oscillating signal 107 to a logic gate 118. The method further comprises selectively outputting the oscillating signal 107, via the logic gate 118, based on the first state or the second state of the data signal 105 to generate a modulated signal 119, and outputting, via the logic gate 118, is the modulated signal 119 to the motor circuit 102.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which.

DETAILED DESCRIPTION

Figure 1:
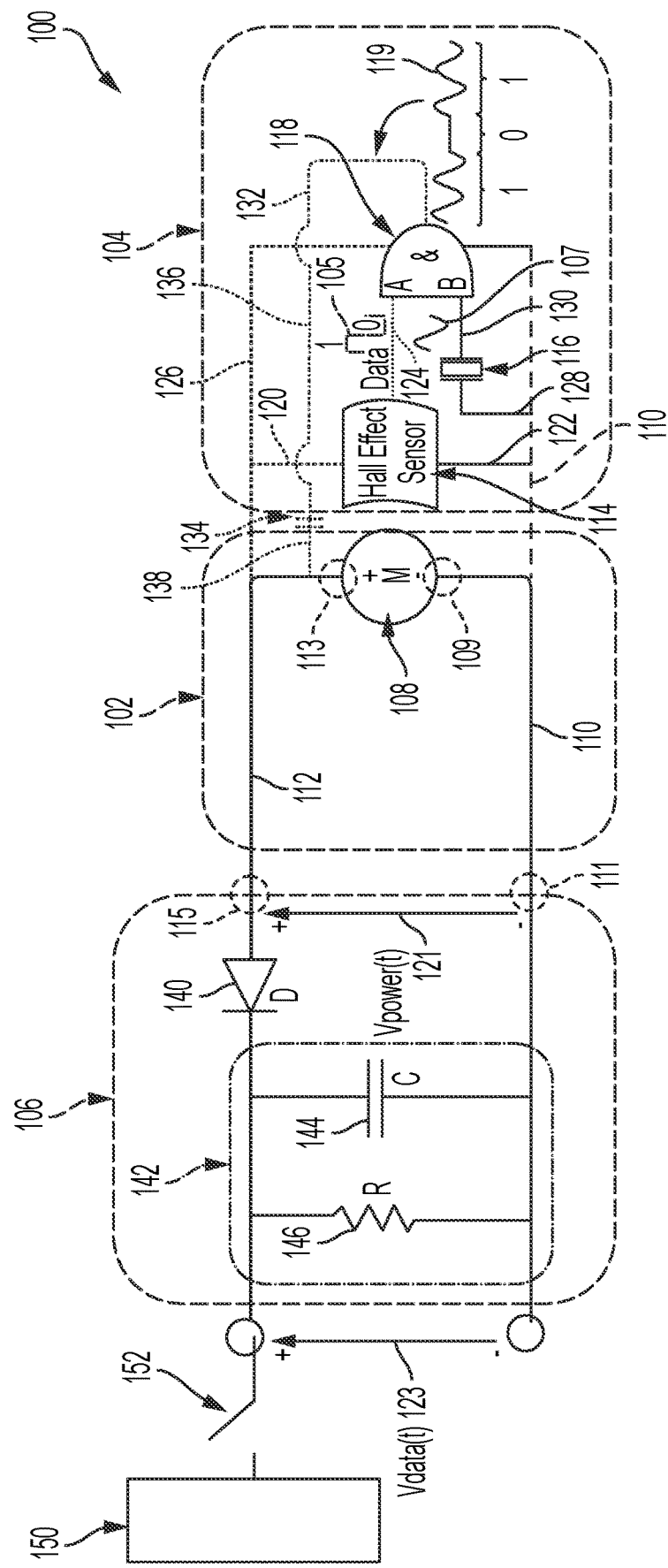
FIG. 1 is a schematic diagram of a motor control system including a motor circuit in signal communication with a ripple circuit according to a non-limiting embodiment.

Either a software approach or hardware approach can be used to process a motor signal. In terms of the software approach, for example, a CPU (e.g., microcontroller) is typically employed to sample the ripple signal, detect parasitic pulses, and process (e.g., digitally filter) the ripple signal to remove the undesired parasitic pulses. However, the signal processing carried out by the CPU results in additional CPU processing time and increased power consumption. In addition, employing CPUs capable of executing the complex algorithms necessary to effectively process the ripple signal can prove to be expensive.

Hardware approaches implement an amplifier that serves as an active bandpass filter for removing noise while detecting input signal to pass and allowing it to pass. CPU processing power is conserved because CPU signal analysis and processing are not required to filter the signal. However, the compatibility of the bandpass filter is limited to the type of motor utilized in the motor control system. For instance, a bandpass filter designed to operate with respect to a two-pole motor is not compatible with a four-pole motor.

In addition, the bandpass filter must be designed with an over-compensating bandwidth to ensure the bandpass filter is operable across the full range of the motor speed, i.e., to ensure it detects the ripple signal across a wide range of motor speeds. In addition, as the motor (e.g., brush) wears over the lifespan of operation, the ripple signal changes, i.e., increases. As a result, the bandwidth of bandpass filter must also be over-compensated to ensure the increased ripple signal resulting from expected motor wear is filtered appropriately.

Various non-limiting embodiments described herein provide a motor control system that includes both a HES and a ripple circuit. The HES is configured to generate a data signal representing the operation of the motor, while the ripple circuit utilizes the data signal that provides information pertaining to the operation of the motor. In one or more non-limiting embodiments, the data signal is generated in response to the operation of the motor, and is combined with a carrier signal to generate a modulation signal. The modulation signal can then be combined with the power signal present on the motor circuit used to power the motor. An oscillator circuit can be employed to generate the carrier signal having a fixed or constant frequency independent from the operation (e.g., speed) of the motor, which is then combined with the data signal and selectively delivered to the motor circuit using a logic gate. For example, when the data signal is at a high state, the oscillator frequency is sent to the motor circuit. When, however, the data signal is at a low state, the oscillator frequency is not sent to the motor circuit, i.e., the logic gate blocks output of the data signal.

The power signal can then be demodulated to extract the data signal and determine the rotational position ($\theta$) and/or rotational speed ($\omega$) of the motor. In this manner, the rotational position ($\theta$) and/or rotational speed ($\omega$) of the motor can be determined without requiring a bandpass filter or expensive controller. In addition, the rotational position ($\theta$) and/or rotational speed ($\omega$) of the motor can be determined without the need to account for changes in the motor speed.

Referring now to FIG. 1, a motor control system 100 is illustrated according to a non-limiting embodiment. The motor control system 100 includes a motor circuit 102, a ripple circuit 104, and a demodulation circuit 106. As described herein, the motor control system 100 utilizes a data signal generated by a HES that is modulated and applied to the power signal present in the motor circuit 102. The ripple circuit 104 implements logic that controls the delivery of the data signal to the power circuit. When data signal is high (e.g. in a logic "1" state), the data signal is output from the ripple circuit 104 and delivered to the motor circuit 102 where it is combined with motor circuit power signal (e.g., 12V signal applied to the motor). When, however, the data signal is low (e.g., in a logic "0") state, the output of the data signal is halted and does not appear in the power signal of the motor circuit 102. The demodulation circuit 106 effectively demodulates the power signal received from the motor circuit 102 to recover the data signal (e.g., the logic "1" or the logic "0") generated by the HES.

The motor circuit 102 includes a motor 108 in signal communication with a ground lead 110 and a power lead 112. The motor 108 is implemented as a direct current (DC) motor 108 that includes a rotor (not shown) and a stator (not shown). The motor 108 can be designed to include a various number of poles. For example, the DC motor 108 can include a 2-pole motor, a 4-pole motor, a 6-pole motor, etc.

The ground lead 110 includes a proximate end 109 and a distal end 111. The proximate end 109 is connected to a ground terminal of the motor 108 and is configured to establish a connection between the motor 108 and a ground protentional. The distal end 111 is connected to a ground connection node of the demodulation circuit 106. Similarly, the power lead 112 includes a proximate end 113 and a distal end 115. The proximate end 113 is connected to a positive terminal of the motor 108 and is configured to deliver a power signal thereto. In one or more non-limiting embodiments, the power signal is a 12 volt (12V) power signal, but the voltage of the power signal is not limited thereto. The distal end 115 is connected to a positive node of the demodulation circuit 106.

The ripple circuit 104 is in signal communication with the motor circuit 102 and the demodulation circuit 106. The ripple circuit 104 includes a sensor 114, an oscillator circuit 116, and a logic gate 118. As described herein the sensor 114 monitors the operation of the motor 108. For example, the sensor 114 is configured to generate a data signal 105 indicative of the rotational position ($\theta$) and/or rotational speed ($\omega$) of the motor 108. That is, the sensor 114 outputs a pulse signal alternating between a high voltage state (e.g., a logic "1" state") and a low voltage state (e.g., logic "0") state. Accordingly, the characteristics of the data signal 105 (e.g., the frequency, voltage, etc.) can provide information pertaining to the rotational position ($\theta$) and/or rotational speed ($\omega$).

The data signal 105 is combined with an oscillating signal 107 to generate a modulated signal 119. The modulated signal 119 can then be selectively delivered to the power lead 112 of the motor circuit and combined with the power signal (Vpower) 121 e.g., the 12V DC supply voltage, based on the state of the data signal. The power signal (Vpower) 121 can then be demodulated to obtain the data signal, and therefore information pertaining to the rotational position ($\theta$) and/or rotational speed ($\omega$) of the motor 108 without requiring use of a bandpass filter or expensive controller.

The sensor 114 is configured to detect a rotational position ($\theta$) and/or rotational speed ($\omega$) associated with the motor 108 and to output a data signal 105 indicative of the rotational position ($\theta$) and/or rotational speed ($\omega$). The data signal 105 includes, for example, pulsed signal such as a square wave 105, for example, defined by one or more high states "e.g., logic "1" state" and one or more low states "e.g., a logic "0" state". The square wave 105 can be generated at a frequency associated with the sensor 114, which in this example is about 65 hertz (Hz), but is not limited thereto.

In at least one non-limiting embodiment, the sensor 114 includes, but is not limited to, an optical sensor or a magnetic field sensor, each capable of detecting the rotational position ($\theta$) and/or rotational speed ($\omega$) associated with the motor 108. In terms of a magnetic field sensor, for example, the sensor 114 can be implemented as a hall effect sensor (HES) 114. The HES 114 can be disposed adjacent to and in close enough proximity to the motor 108 such that it can detect the magnetic field of the magnets included in the motor rotor.

The HES 114 includes a first input 120, a second input 122, and an output 124. The first input 120 is connected to a secondary power line 126 to receive a supply voltage (e.g., 5V). Although not illustrated, the secondary power line 126 may be connected to circuitry such as a DC-to-DC converter (not shown), for example, configured to reduce the voltage (e.g., 12V) present on the power lead 112 to a lower voltage (e.g., 5V) that can be used to power the HES 118 without damage. The second input 122 is connected to the ground potential (e.g., the ground lead 110). The output 124 is connected to a first input (A) of the logic gate 118. During operation of the motor 108, the HES 114 detects rotation of the rotor included in the motor 108 (i.e., detects the presence of the magnet of the rotor as the rotor rotates), and based on the rotation of the rotor outputs the data signal 105.

The oscillator circuit 116 includes a first terminal 128 connected to the ground potential (e.g., the ground lead 110) and a second terminal 130 configured to output an oscillating signal 107. The oscillator circuit 116 is configured to generate the oscillating signal 107 having a fixed (i.e., constant) frequency configured to serve as a modulation signal (also referred to as a carrier signal) for modulating the data signal 105. In one or more non-limiting embodiments, the oscillator circuit 116 can include a crystal oscillator configured to generate a sinusoidal signal having a fixed frequency of about 3 megahertz (MHz). It should be appreciated, however, that other types of oscillating signals having different frequencies can be utilized without departing from the scope of the invention.

The logic gate 118 selectively outputs the oscillating signal 107 based on the high-state or the low-state of the data signal 105. Accordingly, the output of the logic gate 118 effectively operates as a modulated signal 119 indicative of the data signal 105 output by the HES 114. In at least one non-limiting embodiment, the logic gate 118 is implemented as an AND gate that includes a first input (A), a second input (B) and an output 132. The first input (A) is in signal communication with the output 124 of the sensor 114 to receive the data signal 105. The second input (B) is in signal communication with the second terminal 130 of the oscillator 114 to receive the oscillating signal 107. Accordingly, the AND gate 118 selectively generates a modulated signal 119 indicative of the data signal 105 output by the HES 114. For example, the AND gate 118 outputs the modulated signal 119 in response to the data signal 105 having the high state (e.g., logic "1" state) and blocks output of the modulated signal 119 in response to the data signal 105 having the low state (e.g., the logic "0" state). As a result, the modulated signal 119 effectively indicates whether the data signal 105 is at the high state (i.e., logic "1" state) or the low state (i.e., logic "0" state) based on whether the AND gate 118 outputs the modulated signal 119 or blocks output of the modulated signal 119. For example, outputting the modulated signal 119 indicates that the data signal 105 is at the high state (i.e., logic "1" state), while blocking the modulated signal 119 indicates that the data signal 105 is at the low state (i.e., logic "0" state).

The output 132 of the AND gate 118 is connected to the proximate end 113 of the power lead 112. Accordingly, the modulated signal 119 delivered to the motor circuit 102 and is combined with the power signal (Vpower) 121 present on the power lead 112. In at least one non-limiting embodiment, a decoupling capacitor 134 is interposed between the power circuit 102 and the ripple circuit 104 to facilitate delivery of the modulated signal 119 to the power lead 112. For example, the decoupling capacitor 134 can shunt noise present in the ripple circuit 104, thereby reducing its effect on the power circuit 102, while delivering the modulated signal from the logic gate output 119 on to the power lead 112.

The decoupling capacitor 134 is configured to block the DC component coming from the power lead 112 while letting the high frequency modulated signal pass. The decoupling capacitor 134 includes a first terminal 136 connected to the output 132 of the AND gate 118 and an opposing second terminal 138 connected to the proximate end 113 of the power lead 112. Accordingly, the data signal 105 included in the modulated signal 119 is added to the power signal, e.g., the 12V DC motor supply voltage (Vpower) 121 present on the power lead 112.

The demodulation circuit 106 is configured to receive the power signal (Vpower) 121 from the motor circuit 102, which includes a combination of the 12V DC supply voltage and the modulated signal 119, and demodulate the power signal (Vpower) 121 to generate a demodulated signal (Vdata) 123 indicative of the data signal 105 output from the AND gate 118. In one or more non-limiting embodiments, the demodulation circuit 106 includes a diode 140 and a low-pass filter 142. The diode 140 includes an anode connected to the distal end 115 of the power lead 112 of the motor circuit 102 to receive the power signal (Vpower) 121 and a cathode connected to the low-pass filter 142.

The low-pass filter 142 is configured to filter the power signal (Vpower) 121 present on the power lead 112 to effectively output a demodulated signal (Vdata) 123 indicative of the data signal 105. In one or more non-limiting embodiments, the low-pass filter 142 includes a capacitor 144 and a resistor 146 connected in parallel with one another to form an envelope detector circuit. The capacitor 144 includes a first terminal connected to the cathode of the diode 140 and an opposing second terminal connected to the ground potential (e.g., the distal end 111 of the ground lead 110). The resistor 146 includes a first terminal connected to the cathode of the diode 140 and an opposing second terminal connected to the ground potential (e.g., the distal end 111 of the ground lead 110).

Figure 2:
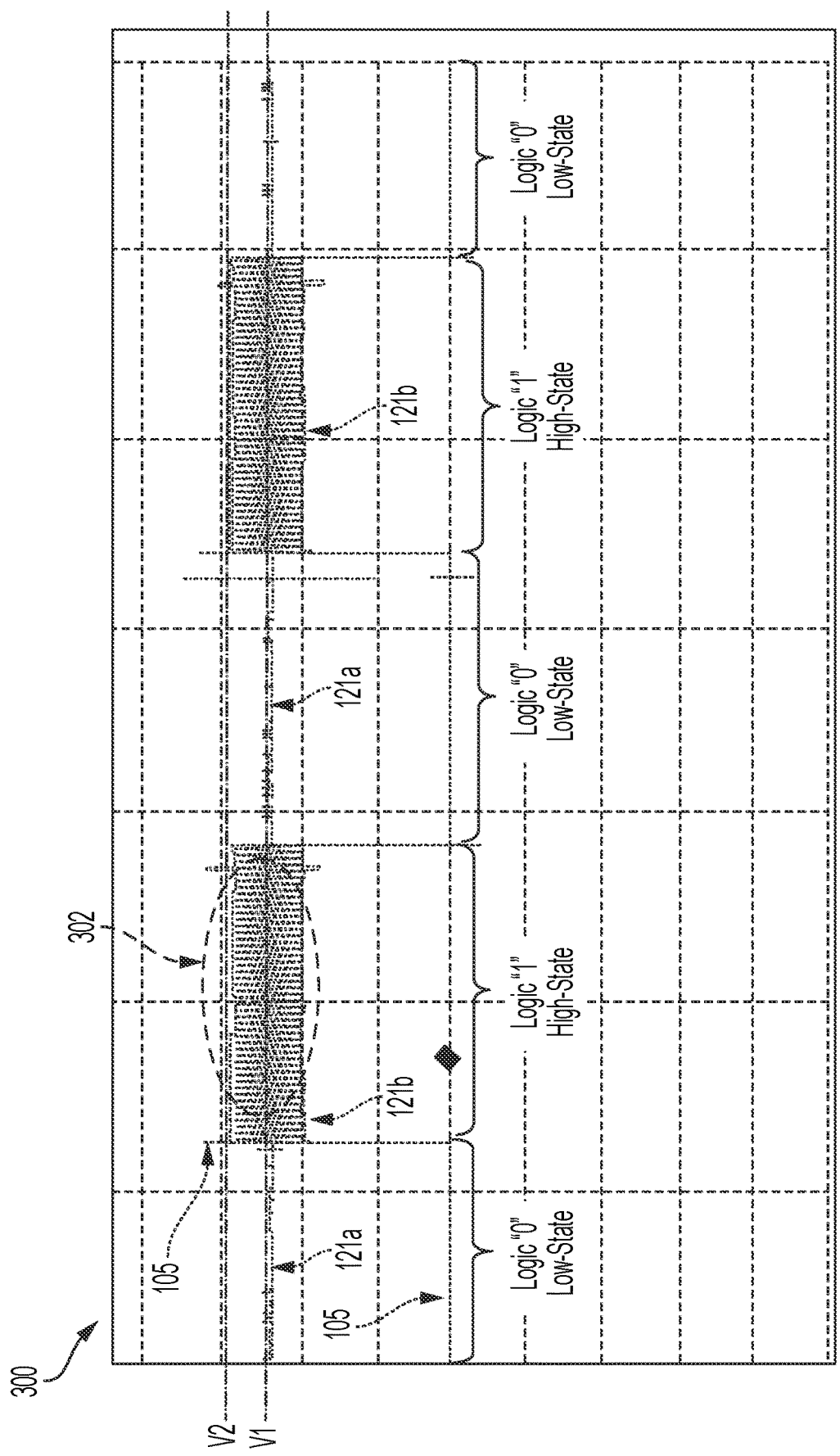
FIG. 2 is a signal diagram illustrating the signal appearing on power lead of the motor circuit shown in FIG. 1 according to a non-limiting embodiment.

Turning to FIG. 2, a signal diagram 300 illustrates an example of the power signal 121a/121b appearing on power lead 112 of the motor circuit shown 102 and delivered to the controller 150. The signal diagram 300 illustrates the power signal 121a/121b based on whether the data signal 105 is in a low-state (e.g., logic "0" state) or in a high-state (e.g., logic "1" state). When the data signal 105 is in the low-state, the power signal 121a present on the power lead 112 excludes the modulated signal 119 (not shown in FIG. 2) output from the AND gate 118, and has a first voltage value (V1). When, however, the data signal 105 is in the high-state, the modulated signal 119 is output from the AND gate 118 and added to the power signal 121b. Accordingly, a combined signal 302 including both the DC motor supply voltage and the modulated signal 119 is generated having an increased second voltage (V2). As described herein, the power signal 121a/121b can be effectively demodulated to extract the data signal 105 when it is present on the power lead 112.

Various non-limiting embodiments described above provide a motor control system that includes both a HES and a ripple circuit. The HES is configured to generate a data signal representing the operation of the motor, while the ripple circuit utilizes the data signal that provides information pertaining to the operation of the motor. In one or more non-limiting embodiments, the data signal is generated in response to the operation of the motor, and is combined with a carrier signal to generate a modulation signal. The modulation signal is combined with the power signal present on the motor circuit used to power the motor. The power signal can then be demodulated to extract the data signal and determine the rotational position ($\theta$) and/or rotational speed ($\omega$) of the motor. In this manner, the rotational position ($\theta$) and/or rotational speed ($\omega$) of the motor can be determined without requiring a bandpass filter or expensive controller. In addition, the rotational position ($\theta$) and/or rotational speed ($\omega$) of the motor can be determined without the need to account for changes in the motor speed.

As used herein, the term "module" refers to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage unit capable of storing algorithms, logic or computer executable instruction, and that contains the circuitry necessary to interpret and execute instructions.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ripple circuit comprising:
    a sensor including a first input configured to receive a power signal generated by a motor circuit via a power lead which provides a power signal to the sensor and a motor, the sensor configured to monitor operation of a motor that is powered by the power signal provided by the motor circuit, and to output a data signal having a first state or a second state based on the operation of the motor;
    an oscillator circuit configured to generate an oscillating signal having a fixed frequency; and
    a logic gate including a first input in signal communication with the sensor to receive the data signal, a second input in signal communication with the oscillator circuit to receive the oscillating signal, and at least one output in signal communication with the power lead of the motor circuit, the logic gate configured to selectively output the oscillating signal based on the first state or the second state of the data signal to generate a modulated signal,
    wherein the logic gate is configured to deliver the modulated signal to the motor circuit, and
    wherein the logic gate feeds back the modulated signal to the power lead to combine the modulated signal with the power signal,
    wherein the sensor is a Hall Effect Sensor (HES) configured to detect one or both of a rotational position ($\theta$) and a rotational speed ($\omega$) associated with the motor, and
    wherein the logic gate is an AND gate including the first input configured to receive the data signal from the HES, the second input configured to receive the oscillating signal from the oscillator circuit, and an output configured to deliver the modulated signal to the motor circuit.

2. The ripple circuit of claim 1, wherein the data signal is indicative of one or both of the rotational position ($\theta$) and the rotational speed ($\omega$).

3. The ripple circuit of claim 1, wherein the AND gate is configured to generate the modulated signal in response to the data signal having the first state and configured to halt the modulated signal in response to the data signal having the second state.

4. The ripple circuit of claim 3, further comprising a decoupling capacitor including a first terminal connected to the output of the AND gate and a second terminal connected to the motor circuit, the decoupling capacitor configured to deliver the modulated signal from the AND gate to the motor circuit.

5. The ripple circuit of claim 4, wherein the decoupling capacitor shunts noise appearing between the motor circuit and the ripple circuit.

6. A method of processing a motor signal, the method comprising:
    generating, via a motor circuit, a power signal and delivering the power signal to a motor and a sensor via a power lead;
    monitoring, via the sensor, the power signal and outputting, via the sensor, a data signal having a first state or a second state based on the operation of the motor;
    generating, via an oscillator circuit, an oscillating signal having a fixed frequency;
    delivering the data signal to a first input of a logic gate, and delivering the oscillating signal to a second input of the logic gate;
    selectively outputting the oscillating signal, via the logic gate, based on the first state or the second state of the data signal to generate a modulated signal;
    outputting, via the logic gate, the modulated signal to the motor circuit, and
    feeding back the modulated signal to the power lead to combine the modulated signal with power signal,
    wherein the sensor is a Hall Effect Sensor (HES) configured to detect one or both of a rotational position ($\theta$) and a rotational speed ($\omega$) associated with the motor, and
    wherein the logic gate is an AND gate including the first input configured to receive the data signal from the HES, the second input configured to receive the oscillating signal from the oscillator circuit, and an output configured to deliver the modulated signal to the motor circuit.

7. The method of claim 6, wherein the data signal is indicative of one or both of the rotational position ($\theta$) and the rotational speed ($\omega$).

8. The method of claim 6, wherein the AND gate is configured to generate the modulated signal in response to the data signal having the first state and configured to halt the modulated signal in response to the data signal having the second state.

9. The method of claim 8, further comprising a decoupling capacitor including a first terminal connected to the output of the AND gate and a second terminal connected to the motor circuit, the decoupling capacitor configured to deliver the modulated signal from the AND gate to the motor circuit.

10. The method of claim 9, wherein the decoupling capacitor shunts noise appearing between the motor circuit and the ripple circuit.

* * * * *